Figure 1:
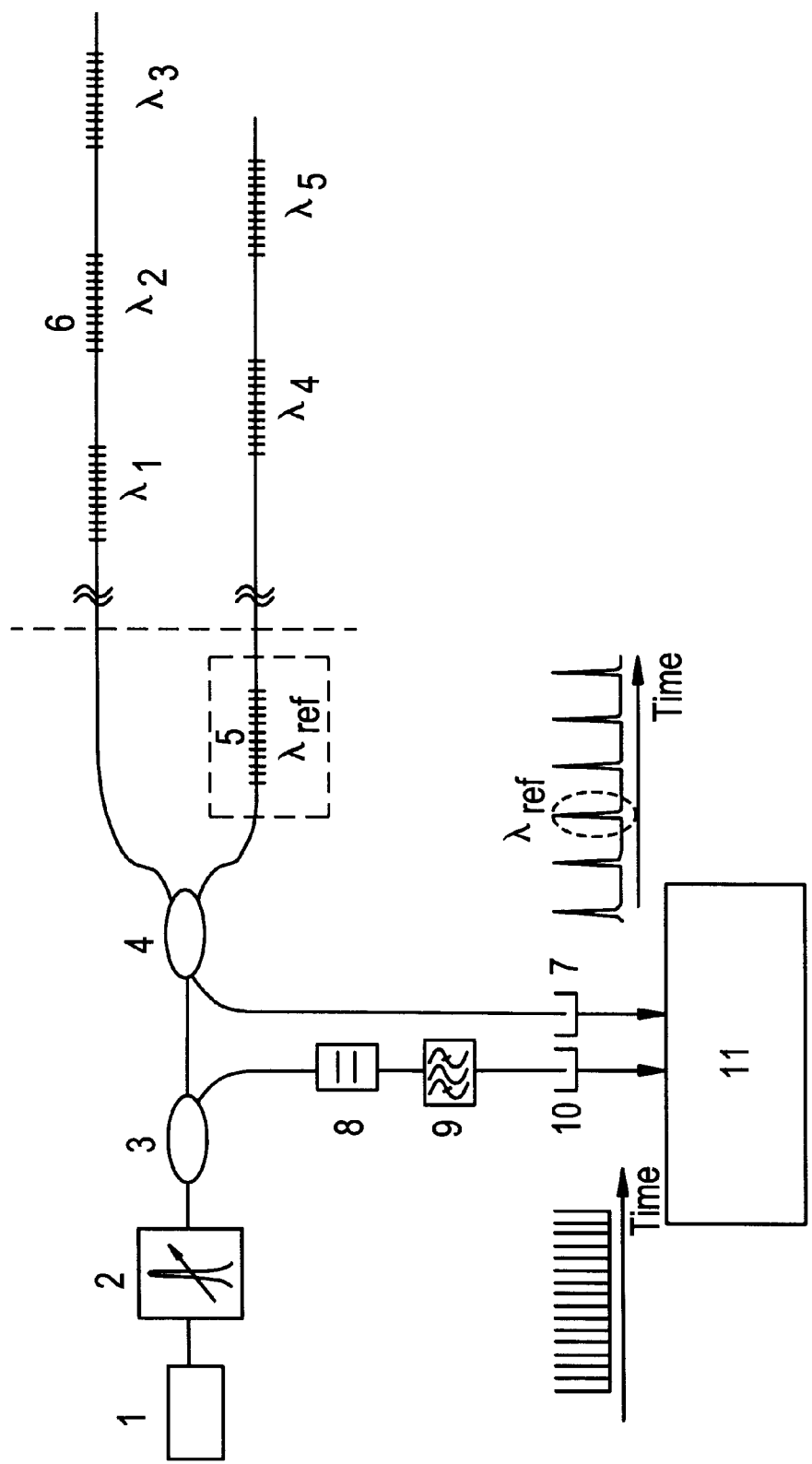

United States Patent [19]
Kringlebotn et al.

[11] Patent Number: 6,097,487
[45] Date of Patent: Aug. 1, 2000

[54] DEVICE FOR MEASUREMENT OF OPTICAL WAVELENGTHS

[75] Inventors: Jon Thomas Kringlebotn; Dag Thingbo; Hilde Nakstad, all of Trondheim, Norway

[73] Assignee: Optoplan AS, Trondheim, Norway

[21] Appl. No.: 09/341,708

[22] PCT Filed: Jan. 29, 1998

[86] PCT No.: PCT/NO98/00031

§ 371 Date: Jul. 29, 1999

§ 102(e) Date: Jul. 29, 1999

[87] PCT Pub. No.: WO98/36252

PCT Pub. Date: Aug. 20, 1998

[30] Foreign Application Priority Data

Mar. 17, 1997 [NO] Norway .................................. 970674

[51] Int. Cl.$^7$ ............................................. G01B 9/02
[52] U.S. Cl. ...................... 356/345; 356/352; 356/349
[58] Field of Search ................... 356/345, 352, 356/349

[56] References Cited

U.S. PATENT DOCUMENTS

| | | | |
|---|---|---|---|
| 5,748,312 | 5/1998 | Kersey et al. | 356/345 |
| 5,757,487 | 5/1998 | Kersey | 356/345 |
| 5,838,437 | 11/1998 | Miller et al. | 356/345 |

*Primary Examiner*—Robert H. Kim
*Attorney, Agent, or Firm*—Dennison, Scheiner, Schultz & Wakeman

[57] ABSTRACT

A device for accurate and repeatable measurements of optical wavelengths, including an interrogation broadband light source (1) and a tuneable optical filter (2). A first part of the light is, in either order, transmitted through the filter (2) and reflected from, or transmitted through, at least one fibre Bragg grating (5) with known Bragg wavelength, providing an absolute wavelength reference, and directed to a first detector (7). A second part of the light is, in either order, transmitted through the filter and transmitted through, or reflected from a Fabry-Perot filter (8) with fixed and known free spectral range, creating a comb spectrum sampling the interrogation source spectrum to provide an accurate frequency/wavelength scale.

10 Claims, 12 Drawing Sheets

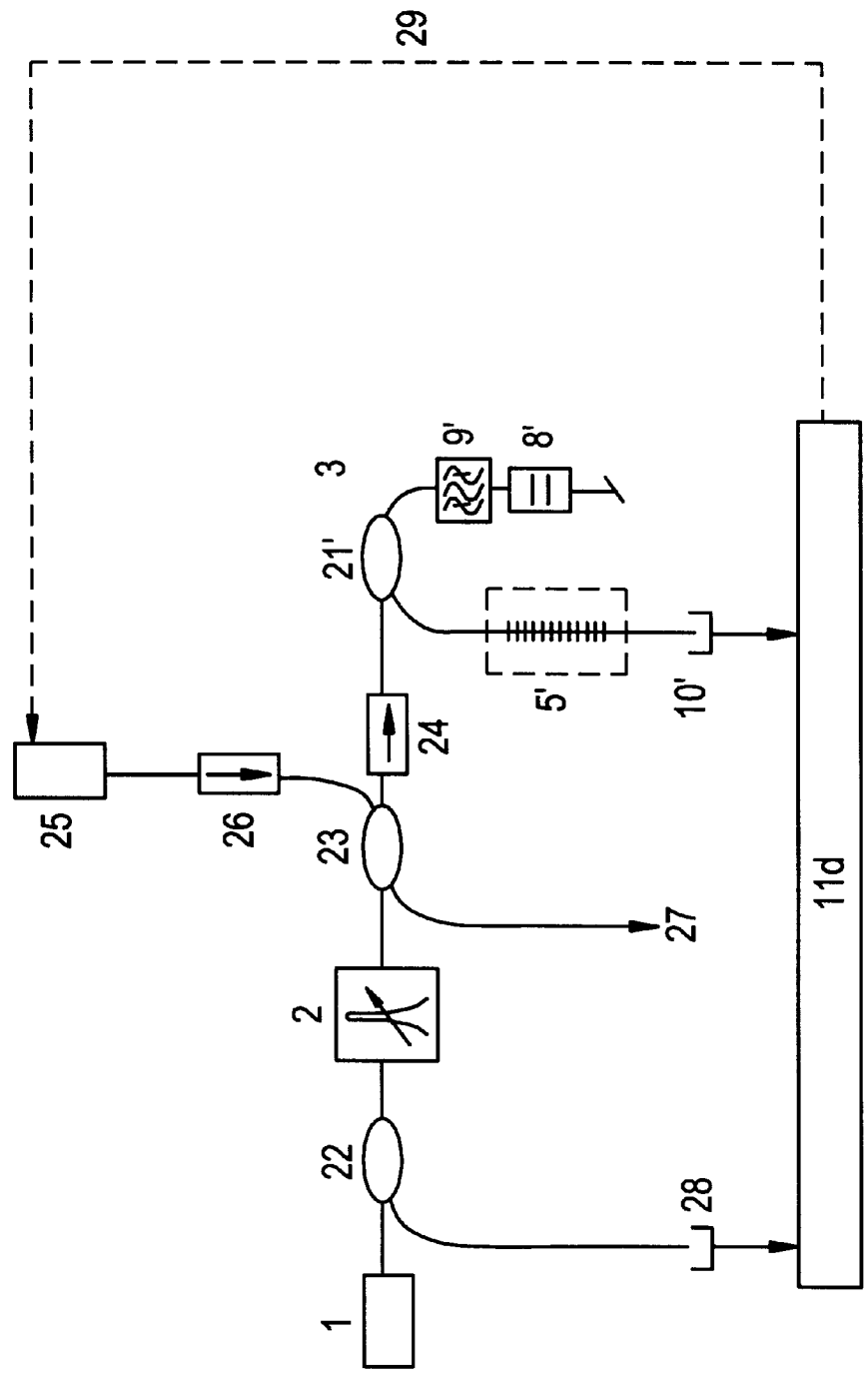

DEVICE FOR MEASUREMENT OF OPTICAL WAVELENGTHS

BACKGROUND

A Fibre Bragg Grating (FBG) is a permanent, photo-induced periodic modulation of the refractive index in the core of an optical fibre, which reflects light within a narrow bandwidth centred at the Bragg wavelength. It is known that FBGs, through measurements of the Bragg wavelengths, can be used to detect any perturbations, such as temperature or strain (at the locations of the FBGs), which changes the physical period of the refractive index modulation and/or the effective refractive index seen by the propagating light along the FBG, and hence the Bragg wavelength. An important feature of FBG sensors is that the reflected Bragg wavelength from an FBG sensing element, with a proper calibration, is an absolute measure of the magnitude of the perturbation(s) at the FBG. However, in sensing applications measuring for example temperatures and strains, the Bragg wavelength has to be measured with a resolution, repeatability and accuracy about 1 pm, which is typically only 0.3–1% of the FBG reflection bandwidth. With a typical Bragg wavelength of 1.55 $\mu$m a Bragg wavelength shift of 1 pm corresponds to a change in strain and temperature of approximately 1 m strain and 0.1° C., respectively.

Another very important feature of FBG sensors is that many FBG sensors can be multiplexed along one or several fibres by writing the FBGs at different wavelengths which do not overlap under sensor operation, to perform quasi-distributed sensing with the FBG sensing elements placed at arbitrary positions separated by a few millimeters up to tens of kilometers.

It is known that one or several reflected FBG sensor wavelengths can be measured using a broadband source, for example an edge-light-emitting diode (ELED) or a super-fluorescent fibre source (SFS), in combination with a tuneable optical filter, for example a piezoelectric transducer (PZT) tuneable fibre Fabry-Perot filter [Kersey, A. D., Berkoff, T. A., and Morey, W. W., "Multiplexed fiber Bragg grating strain-sensor system with a fiber Fabry-Perot wavelength filter", Optics Letters, Vol. 18, pp. 1370–1372, 1993], or alternatively a tuneable laser source, for example an external cavity semiconductor laser with an external tuneable FBG reflector [U.S. Pat. No. 5,401,956 (Mar. 28, 1995)], provided the source spectrum covers all possible FBG sensor wavelengths. These techniques enable simultaneous wavelength demultiplexing and demodulation (wavelength determination) of the various FBG sensors. The transmission wavelength of the tuneable filter (or the laser source) will normally be scanned over the complete wavelength range of the sensors, where the control voltages to the tuning element, or the scan times, corresponding to maxima in the detected power are measures of the sensor Bragg wavelengths. The relationship between the control voltage, or scan time, and the tuning wavelength, i.e. the filter response, will for practical tuning elements not be linear, and will suffer from drift and hysteresis in the filter response. This is particularly true for a PZT-driven tuning element. This implies that some sort of reference scheme is required to measure Bragg wavelengths with high accuracy and repeatability.

Another problem when using broadband sources and tuneable filters for wavelength demodulation of FBG sensors is the effect of gradients and ripples in the filtered source spectrum (i.e. in the real source spectrum and/or the filter transmission spectrum). This can cause small wavelength shifts in the measured peak wavelengths relative to the real Bragg wavelengths of the FBG sensors, which will vary with changing positions of the Bragg reflection spectra relative to the filtered source spectrum, and lead to uncertainties in measured Bragg wavelength.

Wavelength division multiplexing (WDM), using several closely spaced laser transmitter wavelengths, is becoming increasingly important in fibre optic telecommunications to exploit the huge bandwidth provided by optical fibre transmission and enhance the information transmission capacity. In such applications it is essential to set and control the wavelengths of the transmitters with a high degree of accuracy and repeatability. This is also very often the case for the laser wavelength of tuneable lasers, which have many applications in component characterisation, spectroscopy and sensing applications.

Finally, in measuring the reflected wavelengths from FBG sensors with closely spaced Bragg wavelengths, or analysing the various wavelength channels in a densely spaced WDM system in terms of transmitter wavelengths and signal-to-noise ratio, using an instrument based on a tuneable filter, there might be crosstalk between the various sensors/channels caused by the sidebands in the filter transmission spectrum.

OBJECTS

The main object of the invention is to provide a practical device for repeatable, accurate and high-resolution measurements of the reflected Bragg wavelengths from wavelength multiplexed fibre Bragg grating (FBG) sensors, based on the use of a broadband source in combination with a tuneable filter or alternatively a tuneable laser source. The aim is to provide a readout system, which can measure Bragg wavelengths with a resolution, accuracy and long-term repeatability, better than 1 pm, by eliminating the effects of non-linearities, drift and hysteresis in the tuneable filter response, alternatively the tuneable laser response.

A second objective is to eliminate/reduce crosstalk caused by the sidebands in the tuneable filter transmission peak when measuring the reflected wavelengths from FBG sensors with closely spaced Bragg wavelengths, or analysing the various wavelength channels in a densely spaced WDM system.

A third object is to be able to use the wavelength measurement device in a modified version as a spectrum analyser to measure broadband source spectra, for instance the amplified spontaneous emission from optical fibre amplifiers, or to measure the wavelength and amplitude of laser sources.

Finally, a fourth objective is to provide a control system for a tuneable laser to provide a programmable laser wavelength within the tuning range of the laser, or a system for control of the wavelengths and amplitudes of multiwavelength laser arrays for WDM applications.

THE INVENTION

The object of the invention is achieved with a device having features as stated in the characterising part of claim 1. Further features are stated in the dependent claims.

The main part of the invention comprises the use of a broadband source and a tuneable filter, alternatively a tuneable laser, in combination with a novel reference scheme. The tuneable filter is, for example, a tuneable Fabry-Perot filter, a tuneable acousto-optic filter, or a tuneable interference filter. The scheme combines the use of 1) an accurate reference wavelength provided by a temperature stabilised FBG, or an FBG with known temperature and known relationship between the Bragg wavelength and the temperature, and 2) a fixed Fabry-Perot (F-P) filter, consisting of two parallel mirrors with fixed mirror spacing and hence fixed free spectral range, which has a transmission spectrum consisting of narrow peaks equidistant in frequency, to provide a linearisation of the tuneable filter response and hence an accurate frequency scale in the system, and at the same time sampling of the filtered source spectrum. In a preferred embodiment a tuneable light source comprising a broadband source filtered by a tuneable filter, or alternatively a tuneable laser source, will be split in two, the main part being transmitted to the reference FBG and the FBG sensing elements and the reflected signals directed to a detector, while a smaller second part will be transmitted through the fixed F-P filter onto a second detector. By simultaneously sampling the two detector signals and relating the sensor FBG peaks and reference FBG peak at one detector with the comb-spectrum with frequency-equidistant peaks at the second detector, the effect of drift and hysteresis in the tuneable filter response is eliminated and the sensor FBG wavelengths can be determined with a high degree of repeatability. With a proper calibration of the FBG reference wavelength and the frequency separation in the comb-spectrum against absolute wavelength standards, the absolute Bragg wavelengths can also be determined. It is also possible to reconfigure the system for measuring FBG Bragg wavelengths in transmission.

In a second aspect of the invention, the same basic components are used, i.e. a tuneable filter, a fixed F-P filter, and a reference wavelength FBG, to construct either a spectrum analyser with a high degree of wavelength accuracy, or a control system for a tuneable laser or a multi-wavelength laser array to be able to control and set the wavelength of the tuneable laser/wavelengths of the laser array with a high degree of repeatability and accuracy, typically <1 pm.

In a final aspect of the invention crosstalk caused by the sidebands in the tuneable filter transmission peak when measuring the reflected wavelengths from FBG sensors with closely spaced Bragg wavelengths, or analysing the various wavelength channels in a densely spaced WDM system, is reduced dramatically by passing the light through the tuneable filter twice, or by making the tuneable filter a part of a tuneable, narrowband fibre ring laser which is used for measuring the reflected wavelengths from FBG sensors.

EXAMPLES

Figure 2:
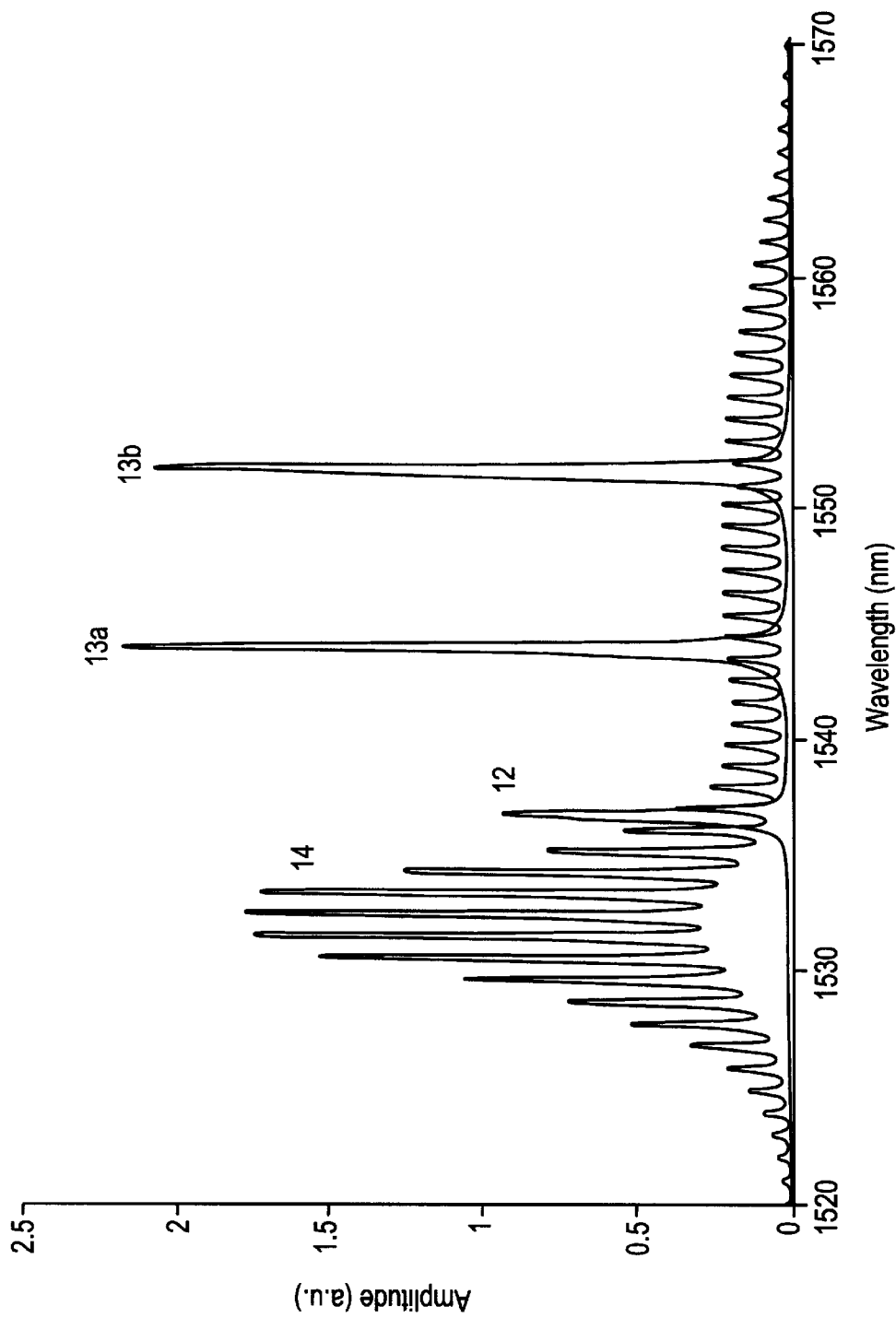
Figure 3:
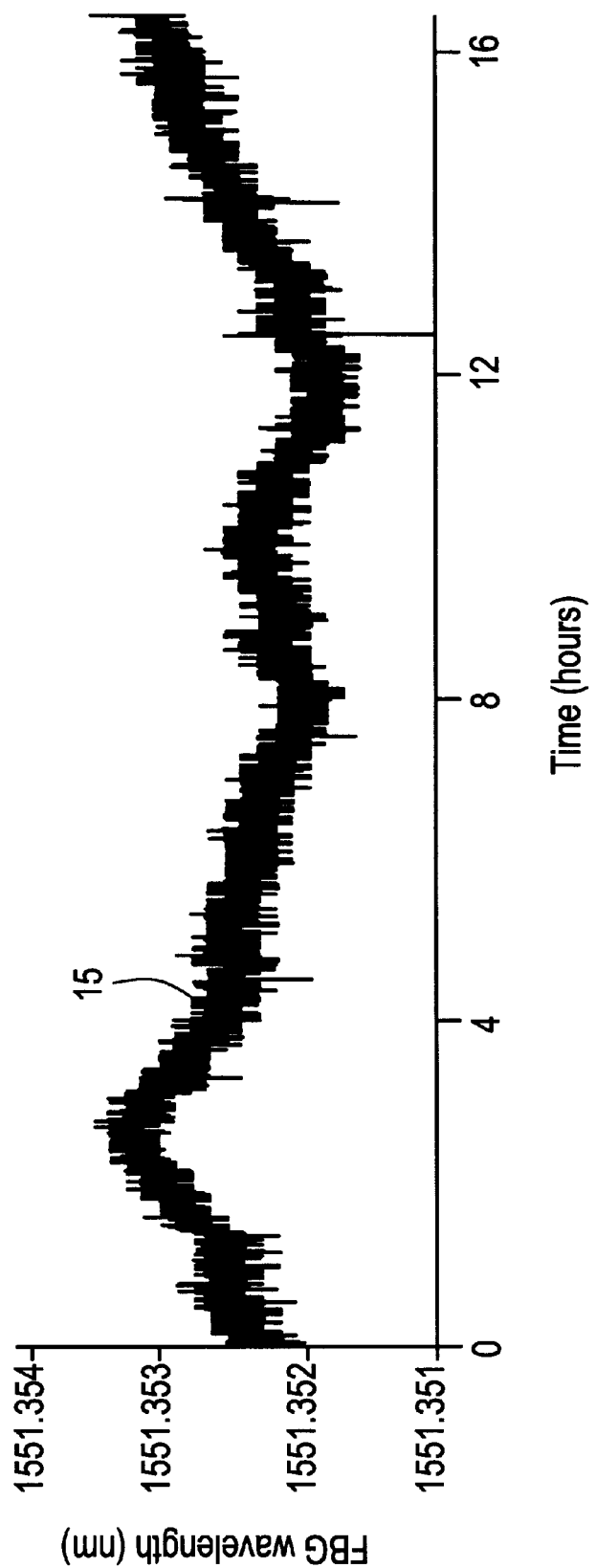
Figure 4:
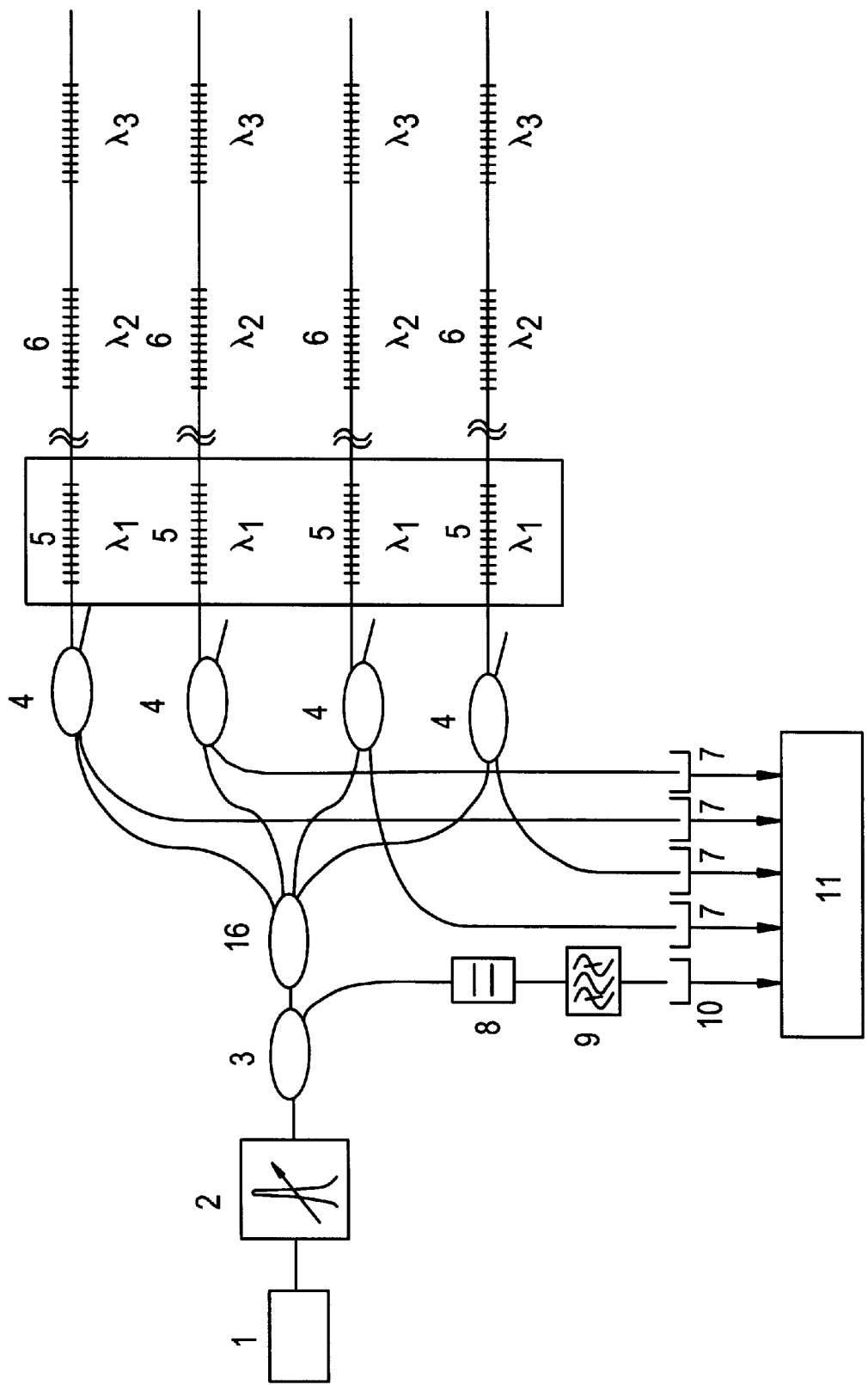
Figure 5:
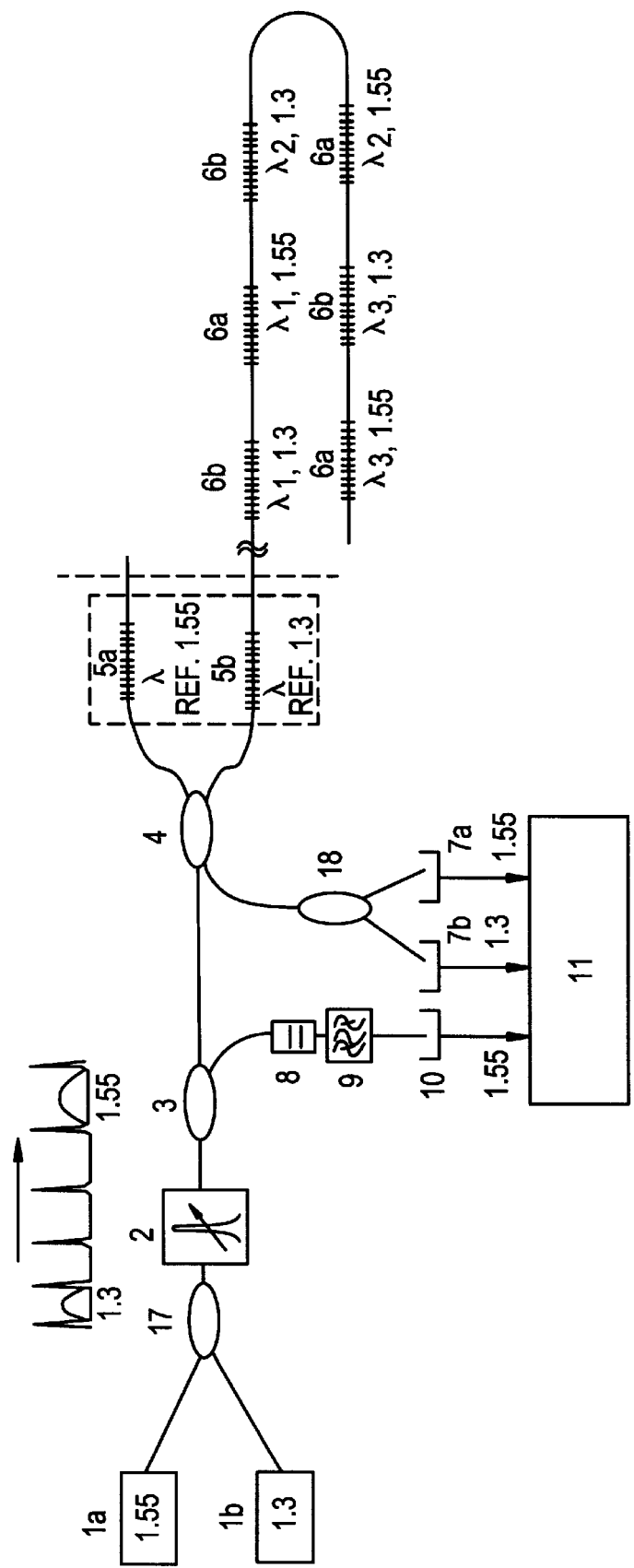
Figure 6A:
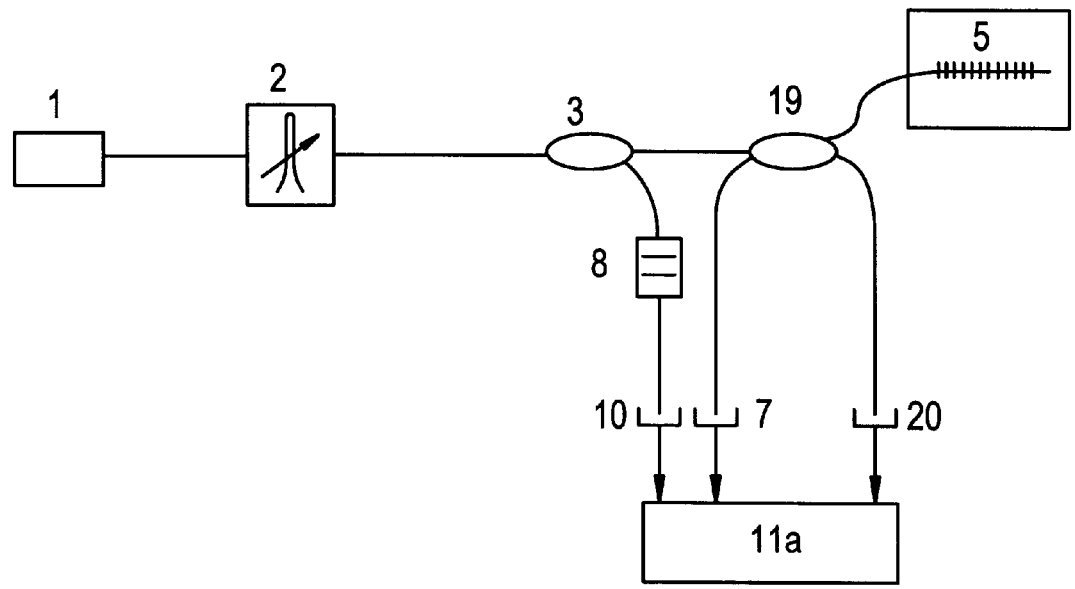
Figure 6B:
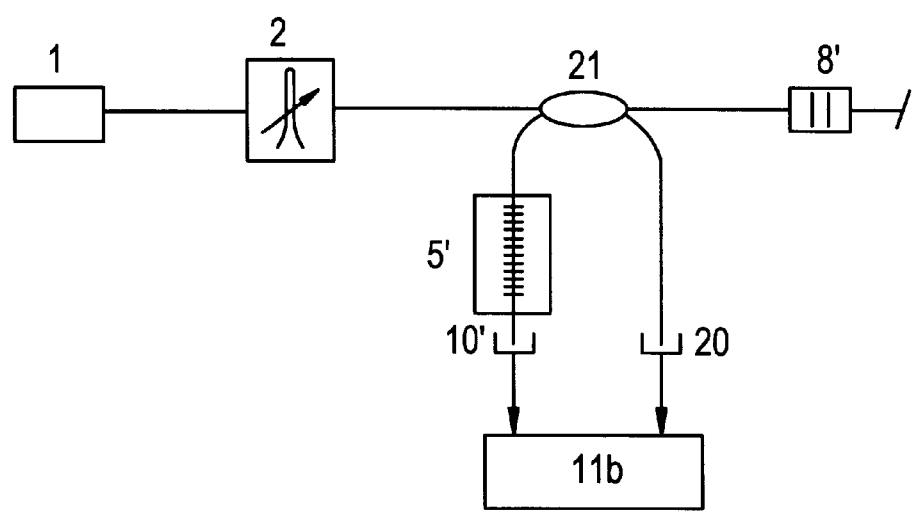
Figure 7A:
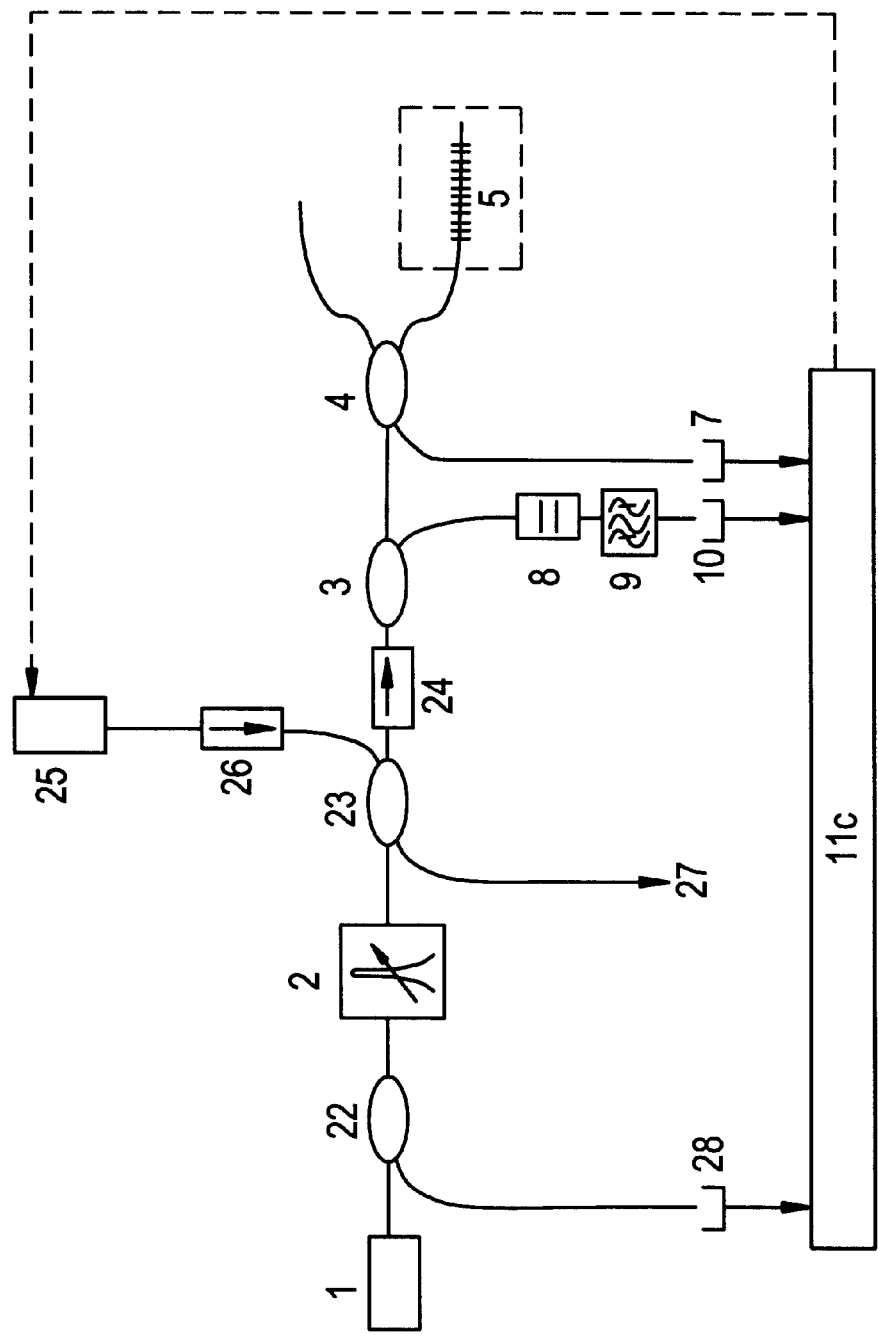
Figure 7C:
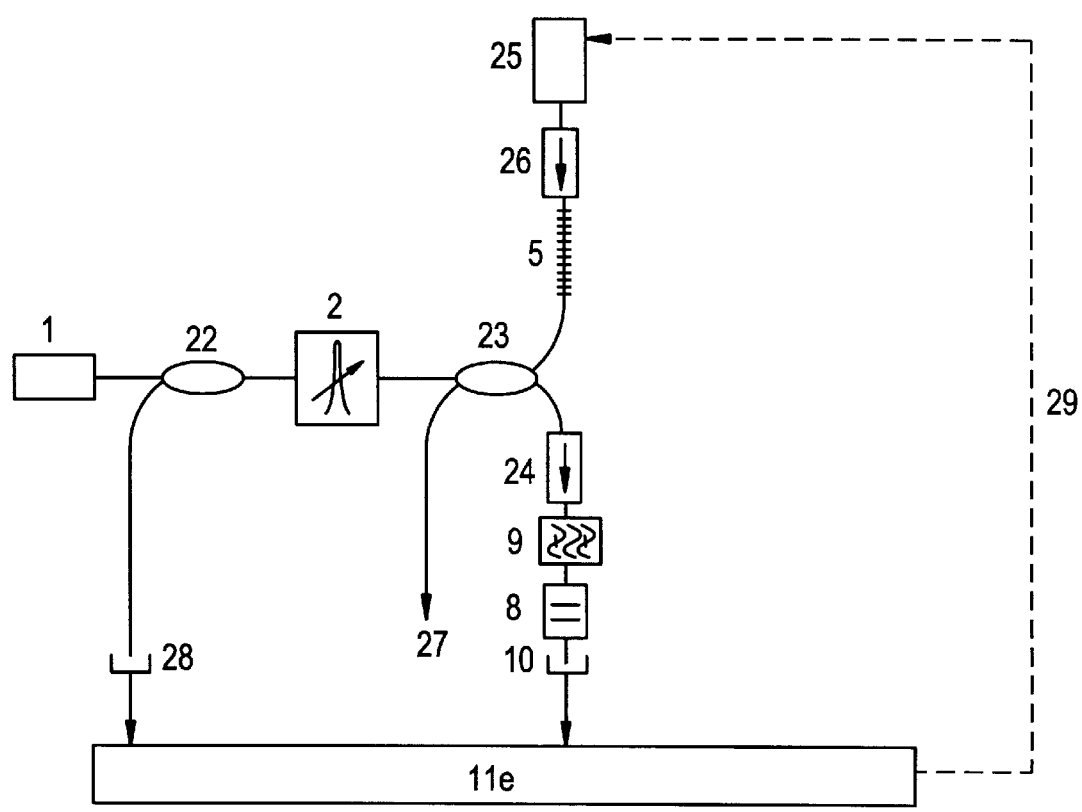
Figure 8:
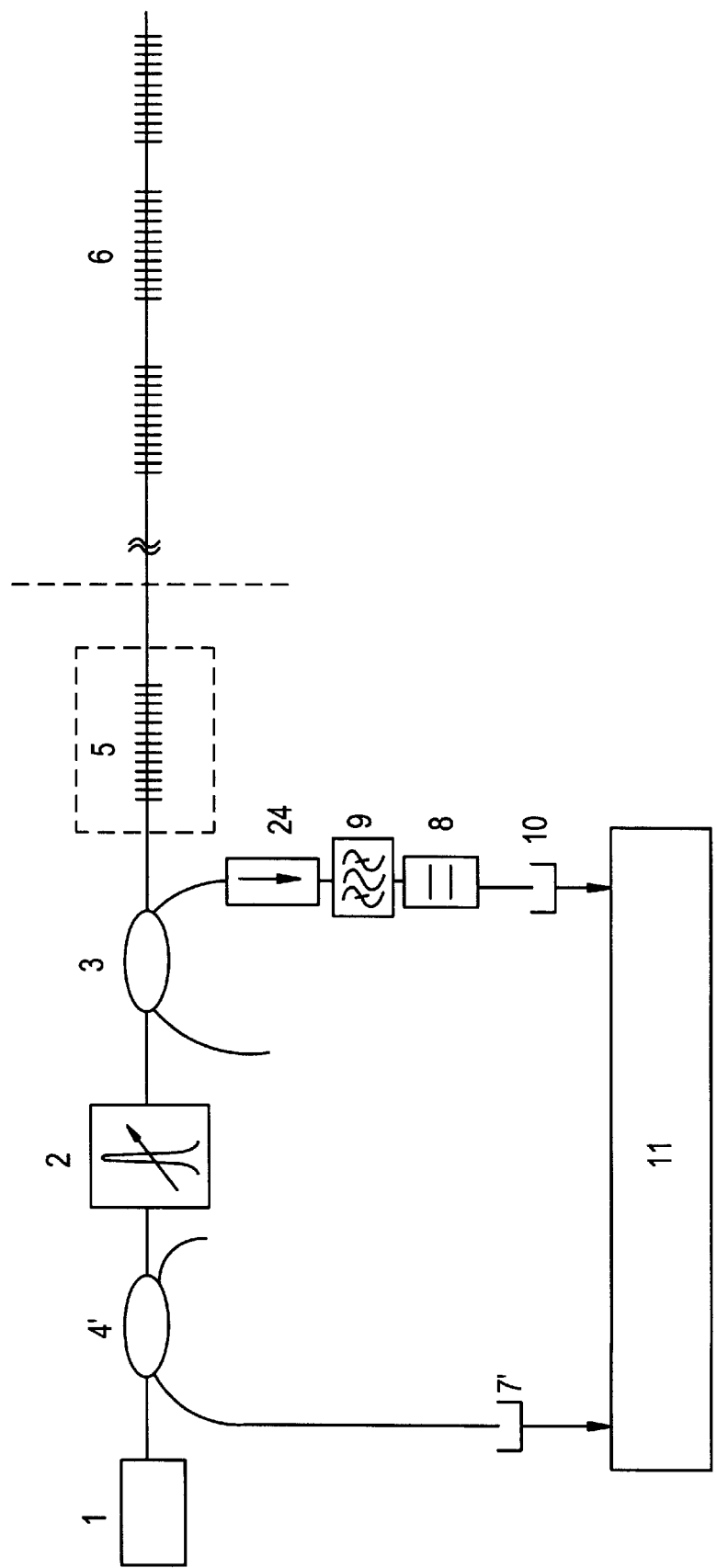
Figure 9:
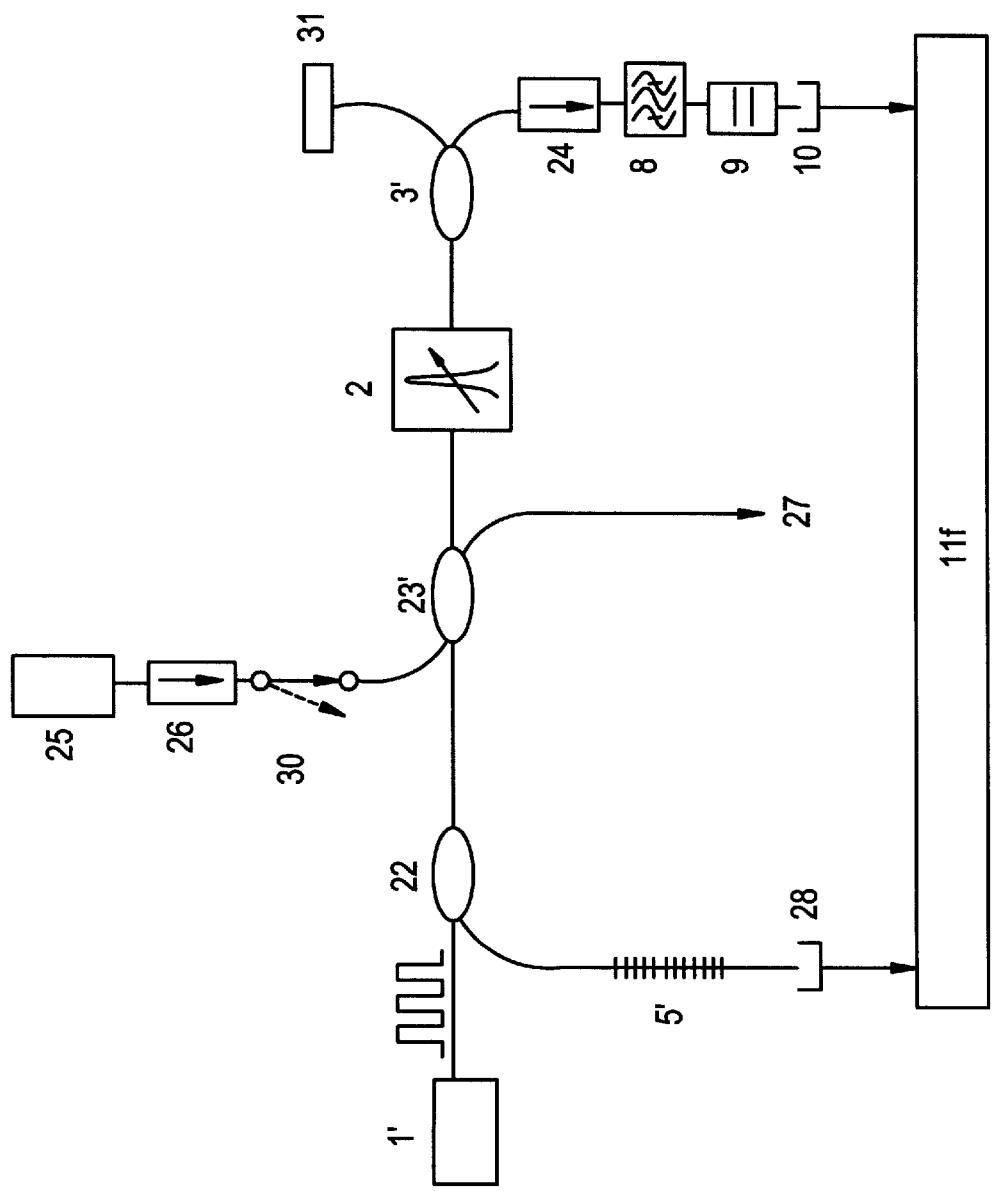
Figure 10:
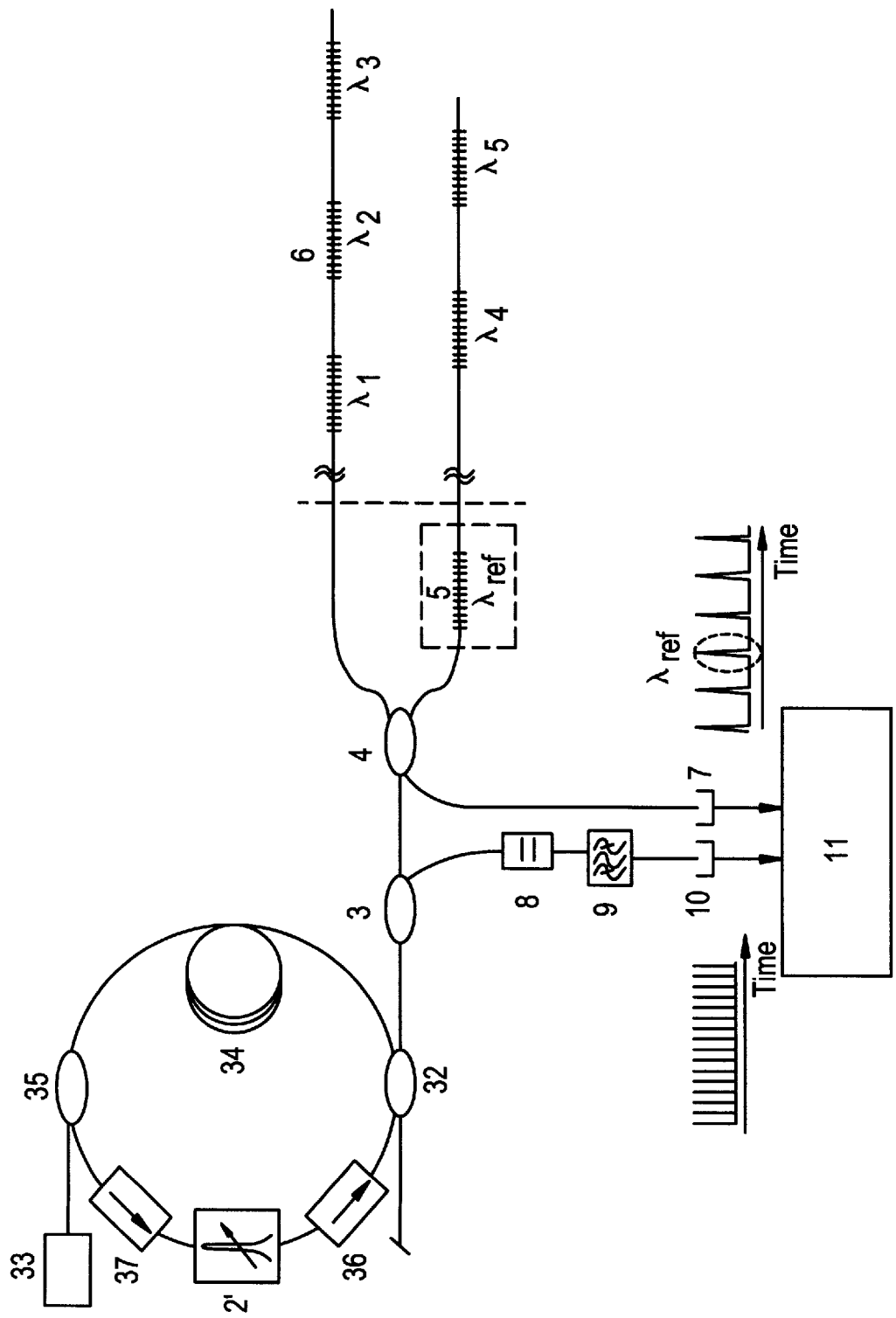

In the following, the invention will be described by means of examples of embodiments and with reference to the illustrations, in which FIG. 1 shows the wavelength measurement device for demultiplexing and demodulation of several FBG sensor wavelengths, FIG. 2 shows the output FBG spectra with one reference FBG and two sensor FBGs and the reference comb-spectrum generated when the SFS source spectrum is filtered by a fixed fibre F-P filter, FIG. 3 shows the measured Bragg wavelength of an FBG at constant temperature measured over a period of 16 hours, FIG. 4 shows the wavelength measurement device for demultiplexing and demodulation of the wavelengths of spatially multiplexed FBG sensor arrays in several fibres, with one detector channel per FBG sensor array, FIG. 5 shows the wavelength measurement device for demultiplexing and demodulation of the wavelengths of two wavelength multiplexed FBG sensor arrays with each array belonging to separate wavelength bands defined by two broadband interrogation sources, FIG. 6a shows a modified wavelength measurement device for measuring the spectrum of a broadband source, FIG. 6b shows an alternative modified wavelength measurement device for measuring the spectrum of a broadband source requiring only two detectors, FIG. 7a shows a modified wavelength measurement device for measuring the wavelength, amplitude and signal-to-noise ratio of one or several laser sources, alternatively for wavelength control of tuneable lasers, FIG. 7b shows an alternative modified wavelength measurement device for measuring the wavelength, amplitude and signal-to-noise ratio of one or several laser sources, or alternatively for wavelength control of tuneable lasers, requiring only two detectors, FIG. 7c shows another alternative modified wavelength measurement device for measuring the wavelength, amplitude and signal-to-noise ratio of one or several laser sources, or alternatively for wavelength control of tuneable lasers, requiring only two detectors, FIG. 8 shows a modified wavelength measurement device for demultiplexing and demodulation of several FBG sensor wavelengths where the light passes the tuneable filter twice, FIG. 9 shows a modified wavelength measurement device for measuring the wavelength, amplitude and signal-to-noise ratio of one or several laser sources, requiring only two detectors, and where the laser light is passing the tuneable filter twice, FIG. 10 shows a modified wavelength measurement device for demultiplexing and demodulation of several FBG sensor wavelengths where the tuneable filter is placed inside a fibre ring together with an fibre gain medium to provide a tuneable, narrowband fibre ring laser.

FIG. 1 shows a preferred embodiment of the wavelength measurement device used for measuring the Bragg wavelengths of several wavelength multiplexed FBGs, typically FBG strain or temperature sensors. The light from a broadband source 1 is passed through a piezoelectrically tuneable F-P filter 2 operated in a wavelength scanning mode covering the Bragg wavelengths of interest. The tuneable F-P filter has a free spectral range exceeding the wavelength range occupied by the FBGs, and a bandwidth similar to the bandwidths of the FBG reflection spectra. The transmitted narrowband light is split in two by a fibre optic directional coupler 3. The main part of the light is passed onto the FBGs 6, including at least one FBG 5 with a known wavelength, providing an accurate wavelength reference, via another directional coupler 4. The reflected light from the FBGs, occurring in time when the wavelength of the narrowband filtered source light matches the Bragg wavelengths of the FBGs, is directed through the directional coupler 4 onto a detector 7 which converts the optical signal to an electrical pulse train as illustrated, with each pulse representing the individual Bragg wavelengths of the FBGs with one pulse representing $\lambda_{ref}$. A smaller part of the split light is transmitted through a fibre F-P filter 8 with fixed and known free spectral range, which produces a reference comb spectrum at the output with peaks having a constant, known frequency separation equal to the free spectral range to provide an accurate frequency/wavelength scale. If the spectrum of the broadband source 1 is broader than the free spectral range of the tuneable F-P filter 2, an optical band pass filter 9 with a narrower passband than this free spectral range is required in combination with the fibre F-P filter 8. The reference comb spectrum is passed onto a second detector 10, producing a reference electrical pulsetrain as illustrated representing the comb spectrum. The signals from detector 7 and 10 are simultaneously sampled, processed and compared in a signal processing and data presentation unit 11, providing accurate and repeatable information on the Bragg wavelengths of the FBGs with a time resolution limited by the scan time of the tuneable F-P filter 2 and/or the processing time of the signal processing unit 11.

FIG. 2 shows the output measured wavelength spectra from the device shown in FIG. 1, with a calculated absolute wavelength scale, using a superfluorescent erbium doped fibre source as the broadband interrogation source which has a spectrum which is narrower than the free spectral range of the tuneable fibre F-P filter. The output from one detector 7 in FIG. 1 has three peaks, peak 12 is the reflection spectrum from a reference FBG with known wavelength, while the peaks 13 A, 13B are the reflection spectra of two FBG sensors. The output 14 from the other detector (10 in FIG. 1) is the reference comb spectrum at the output of the fixed fibre F-P filter.

FIG. 3 shows the measured Bragg wavelength 15 of an FBG using the wavelength measurement device in FIG. 1. The FBG which has the measured spectrum 13b in FIG. 2 is placed in an oven at constant temperature, having temperature fluctuations <0.1° C. The measurement is done over a period of 16 hours, showing drift/variations in measured wavelength of only 1 pm, correponding to temperature variations of approximately 0.1° C., indicating the high degree of repeatability provided by the measurement device. The wavelength resolution is here approximately+0.1 pm, mainly limited by the digitising noise of the device.

FIG. 4 shows a device based on the device in FIG. 1 for demultiplexing and demodulating the Bragg wavelengths of series of FBGs along several fibres onto separate detectors for each series. Light from a broadband source 1 is transmitted through a tuneable filter 2 and split by a directional coupler 3, where the main part is directed to the FBG sensing elements through a fibre optic splitter 16, which splits the light to each of the FBG series with FBGs 6, where typically one FBG 5 in each series has a known Bragg wavelength. The reflected lights from the FBGs are directed through individual directional couplers 4 for each of the four FBG series onto individual detectors 7. A smaller part of the split light at the directional coupler 3 is transmitted through a fixed fibre F-P filter 8 optionally through a bandpass filter 9 onto a detector 10. The detector signals from detector 10 and 7 are simultaneously sampled, processed and compared in a signal processing and data presentation unit 11, providing accurate and repeatable information on the Bragg wavelengths of the FBGs.

FIG. 5 shows a device based on the device in FIG. 1 for demultiplexing and demodulating the Bragg wavelengths of two groups of wavelength multiplexed FBGs with Bragg wavelengths in different wavelength bands, typically the 1.3 and the 1.55 $\mu$m wavelength band, to increase the total available wavelength band, using only one tuneable F-P filter. Light from two broadband ELED sources 1a and 1b centred at 1.3 and 1.55 $\mu$m, respectively, are multiplexed onto one fibre by a WDM coupler 17, transmitted through a tuneable F-P filter 2 passing the two wavelength bands in different filter resonance orders, as illustrated, and split by a directional coupler 3, where the main part is directed to the FBG sensing elements through a directional coupler 2 to the two groups of FBGs 6b and 6a and two reference FBGs 5a and 5b, belonging to the 1.3 and the 1.55 $\mu$m wavelength band, respectively. The reflected lights from the FBGs are directed through the directional coupler 4 and demultiplexed by a WDM coupler 18 onto separate detectors 7a and 7b for the two wavelength bands. A smaller part of the split light at the directional coupler 3 is transmitted through a fixed fibre F-P filter 8 and a bandpass filter 9 passing only one of the wavelength bands onto a detector 10. The detector signals from detector 10, 7b and 7a are simultaneously sampled, processed and compared in a signal processing and data presentation unit 11, providing accurate and repeatable information on the Bragg wavelengths of the FBGs.

FIG. 6a shows a device based on the device in FIG. 1 used for measuring the spectrum of a broadband source, typically a superfluorescent fibre source. The light from the broadband source 1 is transmitted through a tuneable F-P filter 2, which must have a free spectral range wider than the spectral width of the source, and split by a directional coupler 3. The main part is split by another directional coupler 19, where one part goes to a reference FBG 5 with a known wavelength, while the other part is transmitted to a detector 20. The reflected light from the reference FBG 5 is directed through the directional coupler 19 and transmitted to a second detector 7. The smaller part of the split light at the directional coupler 3 is transmitted through a fixed fibre F-P filter 8 onto a detector 10. The detector signals from detector 10, 7 and 20 are simultaneously sampled, processed and compared in a signal processing and data presentation unit 11a, providing accurate and repeatable information on the spectrum of the broadband source.

FIG. 6b shows an alternative configuration to the one in FIG. 6a, used to measure the spectrum of a broadband source, requiring only two detectors. The light from the broad-band source ELED 1 is transmitted through the tuneable F-P filter 2, and split by a directional coupler 21. One part is transmitted directly to a detector 20, while the other part is reflected from a fixed fibre F-P filter 8', resulting in dips in the reflection spectrum at the filter resonances, directed through the directional coupler 21 and transmitted through a reference FBG 5' with a known wavelength, which produces a dip in transmission, onto a second detector 10'. The position of the reference Bragg wavelength relative to the resonance wavelengths of the fixed F-P filter has to be controlled to ensure that the FBG spectral dip does not overlap at any time with the dips in the reflected spectrum from the fixed F-P filter. The detector signals from detector 10' and 20 are simultaneously sampled, processed and compared in a signal processing and data presentation unit 11b, providing accurate and repeatable information on the spectrum of the broadband source.

FIG. 7a shows a device based on the device in FIG. 1 used for measuring the wavelength, amplitude and signal-to-noise ratio of one or several lasers, and alternatively used as a control unit to set and control one or several laser wavelengths. The light from a broadband source 1 is passed through a directional coupler 22, a tuneable fibre F-P filter 2, a directional coupler 23, an optical isolator 24 and split by a directional coupler 3. One part is directed through a directional coupler 4, reflected from a reference FBG 5, and directed through the coupler 4 onto a detector 7. The other part of the split light at coupler 3 is transmitted through a fixed fibre F-P filter 8 and an optical band pass filter 9 and onto a second detector 10. The light from a tuneable laser or a multi-wavelength laser array 25 is transmitted through an optical isolator 26 and split by the directional coupler 23. The main part is the laser output 27. The smaller part is transmitted through the tuneable filter 2 in opposite direction to the light from the broadband source and directed through the directional coupler 22 onto a third detector 28. The signals from detector 28, 10 and 7 are simultaneously sampled, processed and compared in a signal processing and data presentation unit 11c, providing accurate and repeatable information on the laser wavelengths, which through a feedback control signal 29 to the laser 25 can be used to set and control the laser wavelengths.

FIG. 7b shows an alternative configuration to the one in FIG. 7a, used for measuring the wavelength, amplitude and signal-to-noise ratio of one or several lasers, and alternatively used as a control unit to set and control one or several laser wavelengths, requiring only two detectors. The light from a broadband source 1 is passed through a directional coupler 22, a tuneable fibre F-P filter 2 which is designed for negligible backreflections, a directional coupler 23, an optical isolator 24, and a directional coupler 21', and an optical band pass filter 9' before it is reflected from a fixed fibre F-P filter 8', resulting in dips in the reflection spectrum at the filter resonances. The reflected light is directed through the coupler 21' and a reference FBG 5' with a transmission dip at the Bragg wavelength onto a detector 10'. The light from a tuneable laser or a multi-wavelength laser array 25 is transmitted through an optical isolator 26 and split by the directional coupler 23. The main part is the laser output 27. The smaller part is transmitted through the tuneable filter 2 in opposite direction to the light from the broadband source and directed through the directional coupler 22 onto a second detector 28. The signals from detector 28 and 10' are simultaneously sampled, processed and compared in a signal processing and data presentation unit 11d, providing accurate and repeatable information on the laser wavelengths, which through a feedback control signal 29 to the laser 25 can be used to set and control the laser wavelengths.

FIG. 7c shows another alternative configuration to the one in FIG. 7a, used for measuring the wavelength, amplitude and signal-to-noise ratio of one or several lasers, and alternatively used as a control unit to set and control one or several laser wavelengths, requiring only two detectors. Light from a broadband source 1 is passed through a directional coupler 22, a tuneable fibre F-P filter 2 which is designed for negligible backreflections, and split by a directional coupler 23, where one part is transmitted through an optical isolator 24, an optical band pass filter 9 and a fixed fibre F-P filter 8 and onto a detector 10, while a second part is reflected by a reference FBG 5 with known wavelength outside the wavelength band of the spectrum of the source to characterised, passed back through the tuneable filter 2 and directed by the coupler 22 onto a second detector 28. The light from a laser or a multi-wavelength laser array 25 is transmitted through an optical isolator 26, through the reference FBG 5 and split by the directional coupler 23. The main part is the laser output 27. The smaller part is transmitted through the tuneable filter 2 in opposite direction to the light from the broadband source and directed through the directional coupler 22 onto the second detector 28. The signals from detector 28 and 10' are simultaneously sampled, processed and compared in a signal processing and data presentation unit 11d, providing accurate and repeatable information on the laser wavelengths, which through a feedback control signal 29 to the laser 25 can be used to set and control the laser wavelengths.

FIG. 8 shows a modified wavelength measurement device for demultiplexing and demodulation of several FBG sensor wavelengths where the light passes the tuneable filter twice. The light from a broadband source 1 is passed through a directional coupler 4' and then through a tuneable F-P filter 2 operated in a wavelength scanning mode covering the Bragg wavelengths of interest. The transmitted narrowband light is split in two by a fibre optic directional coupler 3. The main part of the light is passed onto the FBGs 6, including at least one FBG 5 with a known wavelength, providing an accurate wavelength reference. The reflected light from the FBGs is coupled back through the tuneable filter 2, which has to be designed for negligible backreflections, by the directional coupler 3, providing a double pass configuration, before being directed onto a detector 7' by the directional coupler 4'. The double pass configuration will reduce the crosstalk induced by the tuneable filter between FBG sensors closely spaced in wavelength. A smaller part of the light split by the directional coupler 3 is transmitted through an optical isolator, an optical band pass filter 9, and a fibre F-P filter 8 with fixed and known free spectral range, before being passed onto a second detector 10. The signals from detector 7 and 10 are simultaneously sampled, processed and compared in a signal processing and data presentation unit 11, to provide accurate Bragg wavelength measurements.

FIG. 9 shows a modified wavelength measurement device for measuring the wavelength, amplitude and signal-to-noise ratio of one or several laser sources, requiring only two detectors, and where the laser light is passing the tuneable filter twice. The light from the laser sources 25 to be analysed is passed through an optical isolator 26 and alternately being stopped by and passed through an optical switch 30, and passed through a directional coupler 23' before being passed through wavelength scanning tuneable filter 2. A part of the light is directed through a directional coupler 3' before being reflected by a broadband mirror 31, through the coupler 3' and passed back through the tuneable filter 2 a second time before being directed to a detector via the directional couplers 23' and 22. Light emitted from at least one interrogation broadband source 1', which is turned on and off out of phase with the switch 30, is transmitted through the directional couplers 22 and 23' and through the tuneable filter 2, before being split by the directional coupler 3'. A first part of the splitted light is reflected by the mirror 31, through the coupler 3', and passed back through the tuneable filter 2 a second time, before being directed via the directional couplers 23' and 22, through at least one fibre Bragg grating 5 with known reference Bragg wavelength outside the wavelength range of the laser sources to be characterised, generating at least one dip in the transmitted spectrum at the at least one reference Bragg wavelength, onto the detector 28. The second part of the split light is directed via an optical isolator 24, an optional optical bandpass filter 8, and a Fabry-Perot filter 9 with fixed and known free spectral range, to a second detector 10. The signals from detector 28 and 10 are sampled alternately, in phase with the alternating on/off switching of the light from the laser sources to be analysed and on/off modulation of the broadband source, processed and compared in a signal processing and data presentation unit 11f, providing accurate and repeatable information on the laser wavelengths, amplitudes and signal-to-noise ratio.

FIG. 10 shows a modified wavelength measurement device for demultiplexing and demodulation of several FBG sensor wavelengths where the tuneable filter is placed inside a fibre ring together with an fibre gain medium to provide a tuneable, narrowband fibre ring laser for wavelength interrogation of FBGs. The fibre ring laser is closed by a directional coupler 32. Light from a high power semiconductor pump laser 33 is pumping a length of erbium-doped optical fibre 34 through a wavelength division multiplexer 35 to provide gain, which together with feedback via the coupler 32 enable laser operation within the erbium gain bandwidth. The bandwidth of the laser light is restricted by a wavelength scanning tuneable Fabry-Perot filter 2' placed between two optical isolators 36 and 37 to provide unidirectional laser operation with a narrow linewidth. The scanning, narrowband laser light is coupled out via the coupler 32 and split by a directional coupler 3. The main part of the light is passed onto the FBGs 6, including at least one FBG 5 with a known wavelength, providing an accurate wavelength reference, via another directional coupler 4. The reflected light from the FBGs is directed through the directional coupler 4 onto a detector 7. A smaller part of the split light is transmitted through a fibre F-P filter 8 with fixed and known free spectral range, and an optical band pass filter 9 and passed onto a second detector 10. The signals from detector 7 and 10 are simultaneously sampled, processed and compared in a signal processing and data presentation unit 11.

Although the invention has been described and illustrated with respect to the exemplary embodiments thereof, it should be understood by a person skilled in the art that the fore-going and various other changes, omissions and additions may be made without departing from the spirit and scope of the invention.

What is claimed is:

1. A device for accurate and repeatable measurements of optical wavelengths, which can be the Bragg wavelengths of Fibre Bragg Gratings (FBG), including at least one interrogation broadband light source and a tuneable optical filter operated in a wavelength scanning mode to cover all wavelengths of interest, including the known wavelength of at least one FBG which acts as a wavelength reference, characterised in that a first part of the light emitted from at least one interrogation broadband source is, in either order, transmitted through the wavelength scanning tuneable filter and reflected from, or transmitted through, at least one FBG with a Bragg wavelength to be determined and said at least one fibre Bragg grating with known reference Bragg wavelength, and directed to at least one detector, while a second part of the light emitted from the at least one interrogation broadband source is, in either order, transmitted through the wavelength scanning tuneable filter and transmitted through, or reflected from, a Fabry-Perot filter with fixed and known free spectral range, optionally combined with an optical bandpass filter to restrict the wave-length range, creating a comb spectrum sampling the interrogation source spectrum with frequency equidistant peaks or dips with frequency separation equal to the known free spectral range to provide an accurate and repeatable frequency/wavelength scale independently of non-linearities, drift and hysteresis in the wavelength tuning response of the tuneable filter, as well as a means for compensating for errors in the wavelength measurements caused by gradients in the interrogation source spectrum, or wavelength dependent variations in the tuneable filter transmission, and directed to at least one detector, where the electrical output signals from the detectors are simultaneously sampled, compared and processed in a signal processing unit to provide accurate and repeatable wavelength measurements.

2. A device according to claim 1, characterised in that said broadband source and the said tuneable filter are replaced by a tuneable laser source.

3. A device according to claim 1, characterised in that the said device is used to measure the wavelength spectrum of a broadband optical source, with this source being the interrogation source of the device.

4. A device according to claim 1, characterised in that the said device is used to measure the spectrum of at least one optical source, not being the said broadband interrogation source, which can be a tuneable laser source or a multi-wavelength laser array.

5. A device according to claim 1, used for measuring the wavelengths of at least one laser source, characterised in that the accurate information about the laser wavelengths provided by the said device is used in a feedback configuration to set and control the laser wavelength of a tuneable laser or the laser wavelengths of a multiwavelength laser array.

6. A device according to claim 1 for measurement of optical wavelengths, characterised in that the said accurate wavelength reference is provided by at least one FBG with calibrated and known Bragg wavelength, which can be identified at any time, independently of the wavelength scan of the tuneable filter, by having a reflection and transmission spectrum different from any of the spectra to be measured, or combinations of these.

7. A device according to claim 1, for measurement of the Bragg wavelengths of the light reflected from several FBGs along one or several optical fibres, characterised in that the said device includes at least two broadband sources covering different wavelength bands, one said tuneable filter, which can have either one single transmission peak filter covering the combined wavelength band of the sources, or have several transmission peaks, each covering the wavelength band of one source, and wavelength division multiplexers to separate the signals according to wavelength band onto separate detectors, both the reflected Bragg wavelengths, including the said reference Bragg wavelengths, and if required also the said comb spectrum reference wavelengths.

8. A device according to claim 1, characterised in that the part of the light emitted from said at least one interrogation broadband source which is transmitted through said wavelength scanning tuneable filter and reflected from said at least one FBG with a Bragg wavelength to be determined and said at least one fibre Bragg grating with known reference Bragg wavelength, is passed back through said tuneable filter a second time before being directed to a detector.

9. A device according to claim 4, characterised in that the light from the optical sources to be analysed is passed through said wavelength scanning tuneable filter twice by reflecting the light at a broadband mirror, and by alternatively coupling into the said tuneable filter light from the said optical sources to be analysed and the light from said broadband light source, with synchronous, alternating sampling of the detected signals at said two detectors.

10. A device according to claim 2, characterised in that the tuneable laser is a fibre optic ring laser including at least a gain medium, which can be a length of erbium-doped fibre pumped by a semiconductor laser via a wavelength division multiplexer, and said wavelength scanning tuneable filter.

* * * * *